(12) United States Patent
Reutter et al.

(10) Patent No.: US 11,022,271 B2
(45) Date of Patent: Jun. 1, 2021

(54) OPTICAL LAYER AND LIGHT FIXTURE WITH SUCH AN OPTICAL LAYER

(71) Applicant: REGENT BELEUCHTUNGSKÖRPER AG, Basel (CH)

(72) Inventors: Kornelius Reutter, Basel (CH); Oscar Fernandez, Pratteln (CH); Rolando Ferrini, Bern (CH); Christian Hochfilzer, Basel (CH); Thierry Dreyfus, Basel (CH)

(73) Assignee: REGENT BELEUCHTUNGSKÖRPER AG, Basel (CH)

( * ) Notice: Subject to any disclaimer, the term of this patent is extended or adjusted under 35 U.S.C. 154(b) by 146 days.

(21) Appl. No.: 15/762,283

(22) PCT Filed: Sep. 22, 2016

(86) PCT No.: PCT/EP2016/072591
§ 371 (c)(1),
(2) Date: Mar. 22, 2018

(87) PCT Pub. No.: WO2017/050923
PCT Pub. Date: Mar. 30, 2017

(65) Prior Publication Data
US 2018/0299095 A1    Oct. 18, 2018

(30) Foreign Application Priority Data

Sep. 24, 2015 (CH) .................... 1382/15

(51) Int. Cl.
*F21V 5/00* (2018.01)
*G02B 5/02* (2006.01)
(Continued)

(52) U.S. Cl.
CPC .............. *F21V 5/005* (2013.01); *G02B 5/021* (2013.01); *G02B 5/0278* (2013.01); *G02B 5/045* (2013.01);
(Continued)

(58) Field of Classification Search
CPC ......... F21V 5/005; G02B 5/045; G02B 5/021; G02B 5/0231
See application file for complete search history.

(56) References Cited

U.S. PATENT DOCUMENTS

2002/0045907 A1\* 4/2002 Sherman ............ A45D 26/0004
606/131
2005/0058947 A1 3/2005 Rinehart et al.
(Continued)

FOREIGN PATENT DOCUMENTS

CN 202852682 U 4/2013
EP 2 647 904 A1 10/2013
(Continued)

OTHER PUBLICATIONS

International Search Report dated Dec. 14, 2016 in corresponding International Patent Application No. PCT/EP2016/072591.
(Continued)

*Primary Examiner* — Evan P Dzierzynski
(74) *Attorney, Agent, or Firm* — Medler Ferro Woodhouse & Mills PLLC

(57) ABSTRACT

An optical layer made from a light-permeable material includes a surface and an optical microstructure having a plurality of elevations. The elevations of the microstructure protrude from a reference plane, which is parallel to the surface. The elevations of the microstructure each have a flank section which adjoins the reference plane and forms a uniform angle with the reference plane. The uniform angle is in a range from about 10° to about 26° or in a range from
(Continued)

about 13° to about 23° or in a range from about 15° to about 20°. The optical layer according to the invention makes it possible for a light fixture to achieve a high light output rate (LOR) at the same time to produce a preferred light distribution curve (LDC).

13 Claims, 2 Drawing Sheets

(51) Int. Cl.
    *G02B 5/04*     (2006.01)
    *F21Y 115/15*     (2016.01)
    *F21Y 105/00*     (2016.01)

(52) U.S. Cl.
    CPC ....... *F21Y 2105/00* (2013.01); *F21Y 2115/15* (2016.08); *G02B 5/0231* (2013.01)

(56) References Cited

U.S. PATENT DOCUMENTS

| | | | | |
|---|---|---|---|---|
| 2011/0115695 A1* | 5/2011 | Lin | .................. | G02F 1/133606 |
| | | | | 345/102 |
| 2012/0127698 A1* | 5/2012 | Lee | ...................... | G02B 5/0215 |
| | | | | 362/97.2 |
| 2013/0070478 A1* | 3/2013 | Edamitsu | ............. | G02B 6/0053 |
| | | | | 362/608 |
| 2013/0107575 A1* | 5/2013 | Wang He | ................ | F21V 5/005 |
| | | | | 362/613 |
| 2015/0285959 A1* | 10/2015 | Samuels | .......... | B29D 11/00278 |
| | | | | 359/720 |
| 2016/0282523 A1* | 9/2016 | Liu | ........................ | G02B 5/045 |

FOREIGN PATENT DOCUMENTS

TW         201317643 A1     5/2013
WO    2012/141899 A1    10/2012

OTHER PUBLICATIONS

Office Action dated Jul. 24, 2020 in corresponding Chinese Appln No. 201680064931.5.

Office Action dated Feb. 9, 2021 in corresponding European Application No. 16775589.1.

* cited by examiner

OPTICAL LAYER AND LIGHT FIXTURE WITH SUCH AN OPTICAL LAYER

TECHNICAL FIELD

The invention relates to an optical layer according to the preamble of independent claim 1 and a light fixture having such an optical layer. Optical layers made from a light-permeable material having a surface and an optical microstructure, which comprises a plurality of elevations, wherein the elevations of the microstructure protrude from a reference plane, which is parallel to the surface, can be used for an application-specific and efficient shaping of emitted and radiated light.

BACKGROUND OF THE INVENTION

Use of transparent lenses equipped with structures is known for adapting and adjusting the light characteristics of light fixtures. In this regard, the lenses cover one or more lighting means such that light radiated from the lighting means penetrates the lens and is adapted by this. For example, such an adaptation can include a directing of the light, an attenuating of the light, a colouring of the light, a diffusing of the light or similar.

As is known, such lenses are produced by forming the structures directly in a solid substrate of the lens. For example, the structures can be cut into the substrate of the lens.

Another efficient means of preparing lenses is to provide a light-permeable substrate with an optical layer that adjusts light or illumination properties. The substrate here can be a transparent solid plastic, glass or the like. By providing the substrate with an optical layer, it can be efficiently provided with application-oriented properties. A lens as required can be produced in this way with relatively little effort.

For example, layers are known which are applied to a substrate, for example, adhesively bonded or fitted. The films themselves can already be adhesive on one side or the films can be attached to the substrate in a manufacturing step of the lens by means of an additional adhesive. Such films are provided to diffuse or attenuate the light in some instances.

An embodiment of such a film is described in WO 2012/141899 A1. The film is produced from a light-permeable material and comprises a surface and an optical microstructure. The optical microstructure consists of a plurality of elevations, which protrude from the surface. The elevations of the microstructure of the film are designed as cones, prisms or pyramids according to the teaching of WO 2012/141899 A1, the sides of which have a random and varying base angle. This base angle corresponds to the angle between a direction orthogonal to the surface of the film and to the associated side of the elevation. It should have a random value between 10° and 60°. The lens provided with the film, firstly, is supposed to help the microstructure to suppress the glare of the penetrating light by directing the light from the sides of the elevations of the microstructure. Secondly, the random base angle of the elevations is supposed to help make the light source less visible or completely invisible, which can be a concern in particular for LED lighting means.

A disadvantage of films or optical layers of the type described above is that relatively low efficiency is achieved in the surface, in particular when they are used in a light fixture to produce planar light. In addition, a light distribution curve (LDC), such as that frequently sought for light fixtures to illuminate surfaces or surface light fixtures, also cannot be achieved by means of such a film. In addition, the shaping of the radiated light beam in particular in the case of light sources which emit undirected light, such as organic light-emitting diodes (OLED), cannot be sufficiently efficient and precise.

Against this background, it is the object of the present invention to propose an optical layer or a light fixture which suppresses glare with relatively high efficiency in the illumination of a surface and which can be used efficiently for undirected or partially directed light sources.

BRIEF SUMMARY OF THE INVENTION

The object is achieved according to the invention by an optical layer, as defined by the features of independent claim 1, and by a light fixture, as defined by the features of independent claim 12. Advantageous alternative embodiments of the invention arise from the dependent claims.

The essence of the invention consists in the following: An optical layer made from a light-permeable material comprises a surface and an optical microstructure having a plurality of elevations. The elevations of the microstructure protrude from a reference plane, which is parallel to the surface. The elevations of the microstructure each have a flank section which adjoins the reference plane and forms a uniform angle with the reference plane. The uniform angle is in a range from about 10° to about 26° or in a range from about 13° to about 23° or in a range from about 15° to about 20°.

The surface of the optical film can be the side of the film, on which the elevations are located. Or it can also be the opposite side of the optical layer, which is typically designed to be flat. In an embodiment, the surface can be at the height of the peaks of the elevations. In this case, the reference plane is parallel and at an interval to the surface. In another embodiment, the surface can also be within the reference plane. The surface is then parallel to the reference plane but not at an interval to it. Typically, the surface and also the reference plane extend almost orthogonally to a main or average emission direction of a light fixture in which the optical layer is used. In many applications such as ceiling light fixtures or floor light fixtures, the main or average emission direction is vertical and the surface or reference plane is correspondingly horizontal. The elevations in this regard typically protrude from the surface.

In relation to the optical layer, the term "light-permeable" can relate in particular to an attenuated or non-attenuated permeability of the light generated by a lighting means of a light fixture.

In relation to the flank section of one of the elevations, the term "uniform" relates to the fact that the elevation forms a single substantially same angle in the circumferential direction with the reference plane. In this regard, there may be tolerance deviations arising, for example, for production reasons, which are still deemed to be uniform in this respect. For example, there can be such tolerance deviations in a range of up to about 1°.

The optical layer according to the invention enables a light fixture to effectively obtain high efficiency in a surface or to achieve a high light output rate (LOR). At the same time, it enables effective and precise shaping of the light being radiated from the light fixture, in particular even if the light fixture has an undirected or partially directed light source, such as one or more organic light-emitting diodes (OLED) for example. Thus a preferred light distribution curve (LDC) can be achieved by the uniform angle of the flank sections of the elevations in the stated ranges. For example, the radiated light can also be shaped asymmetrically or in a wing-like manner. In particular, the glare of the light fixture can be efficiently suppressed in this way.

According to known standards such as DIN EN 12464-1 of the German Institute for Standardization, the term "glare suppression" can refer to the fact that, for certain applications of light fixtures, the light radiated in all lighting angles greater than 65°, when measured in relation to the vertical line directed downwards, must not exceed a light density of 3000 Candela per square metre ($cd/m^2$).

Furthermore, the optical layer according to the invention from an aesthetic point of view can be advantageous as the microstructures are discernible only very limitedly or not at all with the naked eye. An inconspicuous clean appearance can thereby be achieved. The relatively strong glare suppression and light guiding of the layer is also not aesthetically visible; rather, the optical layer can simply visually appear as diffused. This offers many possible applications in design, for example in architecturally integrated lighting. Various LDC can also be realised with the same aesthetics. The "tilting effect" that occurs with known lenses which have a macrostructure can also be prevented with the optical layer. In this regard, "tilting effect" can mean a perception of structures or geometries. In particular, this term can refer to the fact that the illumination surface image produced changes suddenly, i.e. abruptly and not smoothly, at a certain visual angle.

The term "optical layer" within the meaning of the invention can refer to a relatively large-area thin structure. Such structures typically have a much larger surface in relation to the thickness. For example, such structures can have a thickness of less than 1 millimetre (mm) and typically less than 0.1 mm. The associated surface can be virtually any size. For example, it can be at least 5 centimetres (cm) by 5 cm. In the case of the optical layer, this gives a ratio of surface to thickness of at least about 25,000 or typically at least about 250,000.

In a preferred embodiment, the optical layer is formed as an integral layer of an optical part. For example, such an optical part can be a transparent lens. In such a lens, the optical layer with its microstructure can be moulded directly into a solid or also mouldable substrate of the lens. The microstructure can also, for example, be cut, milled or produced using laser ablation in the substrate of the lens. Or the entire lens can be produced together with the optical layer using an injection moulding or injection compression moulding process. The optical layer is integrated into such a single-piece lens, which enables easy handling and ease of use.

In another preferred embodiment, the optical layer is formed as a film. Such films according to the invention can be produced simply and efficiently. They can also be used flexibly. For example, they can be cut relatively easily to the shape of an associated lens or another component of a light fixture. In addition, they can also adapt to the form of the lens or light fixture, for example such as a curvature. Furthermore, such films can also be relatively robust, which enables easy handling over a long service life.

Optical layers, in particular in the form of films, can be produced from different materials. In particular, films made of plastic can be efficiently and flexibly produced. Here, such films are preferably produced from a material having a refractive index in a range of about 1.3 to about 1.7, such as from a plastic like a polycarbonate. Alternative plastics can be, for example, polyethylene or polymethyl methacrylate. In this context, the term "refractive index" is understood to be an optical material property which indicates the factor by which the wavelength and the phase speed of light in a material are less than in a vacuum. In combination with the uniform angle according to the invention, films from such materials enable the effects and advantages of the invention described above to be particularly efficiently achieved.

Films made of plastic or polycarbonate can be provided with microstructures of the type according to the invention in an efficient and precise manner. For example, such microstructures can be formed on or in the plastic using laser ablation, hot stamping, ultraviolet casting, injection moulding, press forming or a generatively structuring method such as 3D printing. For series produced films, it can also be expedient to produce a master and to produce the films by means of reproduction, for example in a roll-to-roll method. To produce the master with the microstructure, laser ablation, milling or micromilling, electron beam processing or generative structuring such as 3D printing, for example, can be used.

The elevations of the microstructure of the optical layer are preferably each shaped as a cone, a prism, a taper or a pyramid. Such shapes enable, in terms of geometry, a relatively simple design of the elevations with clearly defined flank sections in each case. The uniform angles can thus be relatively easily implemented. In addition, an LDC can thus be precisely predetermined.

The elevations of the microstructure preferably have a hexagonal base area. The term "base area" can be understood in particular as the cross-section of the elevation at the height of the reference plane in relation to the elevations. Elevations having hexagonal base areas can enable large or maximum loading of the optical layer with elevations in an efficient manner. In addition, the proportion of zones of the optical layer which have no intended light-shaping effect can also be minimised. The optical layer can thus have relatively high efficiency in terms of the light-shaping or light-directing effect.

The elevations of the microstructure of the optical layer preferably have a rounded peak. The term "peak" can be understood in the context of the elevations to be a region which faces away from the reference plane or farthest from this. The peak of an elevation can be opposite its base area. Such a rounded peak can help to minimise or prevent undesired colour effects or rainbow effects. It can be achieved in that angular shapes or transitions in the microstructure are reduced or avoided. The rounded peaks of the elevations preferably each adjoin their flank sections.

The elevations preferably each comprise a base area corresponding to the hexagonal base area, which has a maximum diameter within a range from about 5 μm to about 250 μm or in a range from about 50 μm to about 200 μm or in a range from about 150 μm to about 190 μm. In addition, the elevations preferably each have a height within a range from about 5 μm to about 100 μm or in a range from about 20 μm to about 80 μm or in a range from about 30 μm to about 60 μm. For elevations each having a base area and a peak, the height can be defined by the distance between the base area and the peak. Elevations dimensioned such as a microstructure enable the optical layer to produce a preferred effect and simultaneously be able to be relatively efficiently produced.

The uniform angle can be between individual elevations or between groups of elevations. This means the stated angles are uniform per elevation but vary among elevations. This can enable flexible adapting of an LDC. However, all elevations of the microstructure of the optical layer preferably have a same uniform angle. The term "same" in relation to uniform angles can refer to the fact that all elevations have an identical uniform angle. Thus tolerance deviations arising, for example, for production reasons can occur, which are still deemed to be same in this sense. For example, such tolerance deviations can have a value in a range of up to about 1°. An optical layer designed as such efficiently enables a preferred or intended effect to be homogeneously produced.

Another aspect of the invention relates to a light fixture having a lighting means and an optical layer as described above. Light can be radiated in a substantially undirected or partially directed manner by the lighting means. The optical layer covers the lighting means in a radiation direction of the light fixture. The lighting means can for example be an OLED or an OLED field. Alternatively, it can be an illuminating diode equipped with a light-diffusing lens or a field of such illuminating diodes.

The term "illuminating diode" can be taken to be synonymous with light-emitting diode (LED). The illuminating diodes in one view can, for example, have a round, elliptic, square, or rectangular shape. They can be attached on a circuit board, which can additionally be equipped with an electronic control system to operate the illuminating diodes.

The term "circuit board" can refer in this context to a printed circuit board (PCB), which is a carrier for electronic components. In general, circuit boards are used for mechanical fixation and electronic connection of electronic components. Circuit boards or printed circuit boards usually consist of an insulating material having conducting connections adhering thereto (conductor paths). Fibre-reinforced plastic is prevalent as the insulating material. The conductor paths are normally etched from a thin layer of copper. The components are soldered onto soldering pads or into solder land. Larger components can also be attached to the printed circuit board by means of cable ties, adhesive or screw connections.

The term "undirected" in relation to the lighting means of the light fixture can refer to the light being radiated in a certain direction in a non-predefined manner, but rather in a certain range in various directions. Undirected light can also be described as diffuse light or comprise such. This term can in particular be understood to mean that the lighting means radiates light in a certain range in a random or undefined direction. A partially directed light fixture can also be included therein, as long as there is a proportion of undirected light in the above sense.

With a light fixture according to the invention, the effects and advantages explained above in relation with the optical layer can be realised in an efficient manner. The optical layer in this regard can be integrally implemented into a transparent lens. Alternatively, it can be attached to a solid part of the lens. For example, the optical layer can be applied to the solid part or adhered to this. When adhering the optical layer to the solid part of the lens, care must be taken to ensure that the adhesive used also has a refractive index. In order not to affect the lighting design of the optical layer, an adhesive or glue with a refractive index as close to 1 as possible is preferably used. In particular, the light fixture can be preferably formed as a surface light fixture. In this regard, it can have a field of OLEDs or LEDs as the lighting means.

The light fixture can be assembled in a stacked manner. The light source can be separated in the process by an air gap from the optical layer, thus forming a stack. Or the optical layer can be attached to the lighting means by means of an adhesive so that the lighting means, adhesive and optical layer form a stack. Such a stacked construction enables a compact design.

The optical layer is preferably arranged in the light fixture immediately adjacent to the lighting means. The term "immediately adjacent" can in this context refer to the optical layer being located as close as technically practical or feasible to the lighting means. It is possible for the optical layer to be adapted to the shape of the light fixture or specific components thereof in that the optical film can be designed relatively thinly, adjustably and/or flexibly by means of the microstructure according to the invention. The light fixture can thus be extremely compact, which can be advantageous in many applications.

The optical layer according to the invention and the inventive light fixture can, for example, be advantageous or used in the following fields of application: architectural lighting applications, theatre lighting applications and general lighting applications. The fields of use also include underwater lighting applications such as in swimming pools, fountains or spa pools, traffic lighting applications, vehicle lighting applications, medical lighting applications such as in hospitals, office and school lighting applications, retail and shop lighting applications and general industrial lighting applications.

The general illumination applications as listed above can be private, commercial and industrial lighting applications. There might be the following characteristics: Light is used in the visible range with a wavelength of between 350 mm and 850 nm, the lights are standardised and replaceable, the lights are produced according to the IEC/PAS 62717 standard "Performance requirements—LED modules for general lighting" or the standard "IEC/PAS 62722 Performance requirements—LED luminaries for general lighting", the lights include intelligence such as sensors and communication cells in order to provide connected lighting, and/or the lights have a general lighting purpose and can be categorised functionally and decoratively.

The traffic lighting applications as listed above can be advanced lighting applications, with which the intention is to provide services relating to different types of transport and traffic management. They can allow different users to be better informed and allow networks to be used more safely, smartly and with more coordination. For example, such traffic lighting applications can be found in intelligent transport networks (ITS) in all kinds of transport. In the EU Directive 2010/40/EU (7 Jul. 2010), it is thus defined what information and communication technologies are used in ITS systems in fields such as road transportation, including infrastructure, vehicles and users, and in traffic or mobility management, and interfaces for other types of transportation.

The vehicle lighting applications as listed above can be all lighting applications which provide light inside and outside private vehicles and light-duty and heavy-duty utility vehicles. Such applications can include the following, for example: Front and rear lights, visibility, signalling and identification lights, emergency warning devices, interior and comfort lighting, including dispersion lighting and in-service-vehicles.

BRIEF DESCRIPTION OF THE DRAWINGS

Further advantageous embodiments of the invention arise from the following description of exemplary embodiments of the invention with reference to the schematic drawing. In particular, the optical layer according to the invention and the light fixture according to the invention are described below in more detail with reference to the attached schematic drawings on the basis of exemplary embodiments. Shown are.

DETAILED DESCRIPTION OF EMBODIMENTS OF THE INVENTION

Figure 1:
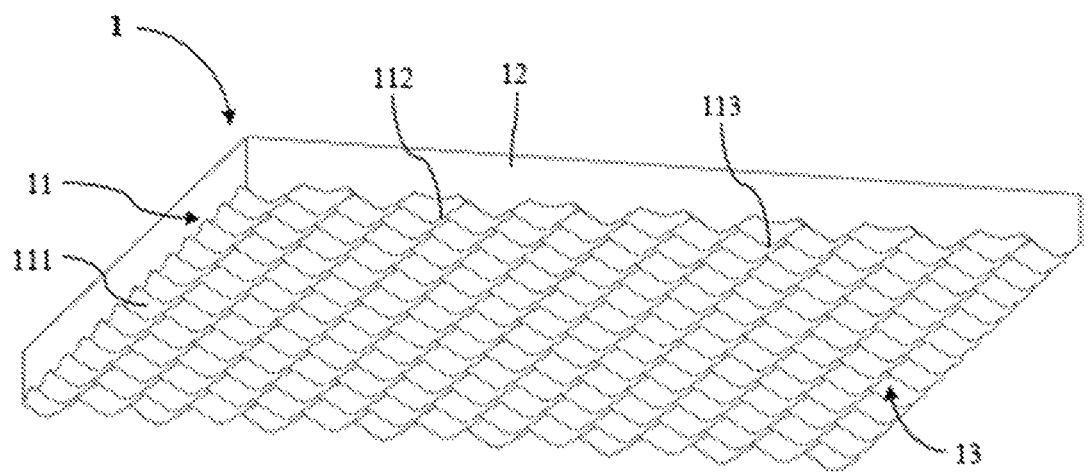
FIG. 1 shows a perspective view of an exemplary embodiment of a film as an optical layer according to the invention.

Certain expressions are used in the following description for practical reasons and must not be construed as limiting. The words "right", "left", "down" and "up" designate directions in the drawing to which reference is made. The expressions "inward", "outward", "below", "above", "left", "right", or the like are used to describe the arrangement of designated parts relative to one another, the movement of designated parts relative to one another, and the directions toward or away from the geometric centre of the invention as well as named parts of same, as depicted in the figures. These relative spatial indications also comprise positions and orientations other than the ones depicted in the figures. For example, if a part depicted in the figures is turned around, then elements or features described as "below" are then "above". The terminology comprises the words expressly mentioned above, derivatives thereof, and words of similar meaning.

In order to avoid repetitions in the figures and in the associated description of the different aspects and exemplary embodiments, certain features should be understood as common to different aspects and exemplary embodiments. The omission of an aspect from the description or from a figure does not mean that this aspect is lacking in the associated exemplary embodiment. Instead, such an omission may be made for the sake of clarity and for avoiding repetitions. The proportions of the parts represented in the figures can also deviate from the actual proportions. For example, the thickness or height of the film in the figures is represented in an enlarged view in relation to its dimension or area. In particular, certain dimensions can be represented in an enlarged view so that individual features are more clearly visible.

FIG. 1 schematically shows a film 1 as an exemplary embodiment of an optical layer according to the invention. Film 1 is, for example, produced from polycarbonate as a light-permeable material. It comprises a flat base body 12 and a surface 13. The flat base body 12 is provided on the side of the surface 13 with a microstructure 11, which comprises a plurality of almost hill-shaped or almost cone-shaped elevations 111. The elevations 111 have flank sections 112, which each merge into a rounded peak 113. The flank sections 112 thus adjoin the associated rounded peaks 113. The elevations 111 are distributed uniformly and evenly over the surface 13. The microstructure 11 can be formed using press forming in a roll-to-roll method or using laser ablation in polycarbonate.

The following definition applies to the entire remainder of the description: If there are reference signs are in a figure for the sake of graphic clarity, but not mentioned in the immediately associated descriptive text, then reference shall be made to the explanation thereof in preceding figure descriptions. Furthermore, if reference signs are mentioned in the descriptive text immediately associated with a figure, but are not present in the associated figure, reference shall be made to the preceding and following figures. Similar reference signs in two or more figures stand for similar or the same elements.

Figure 2:
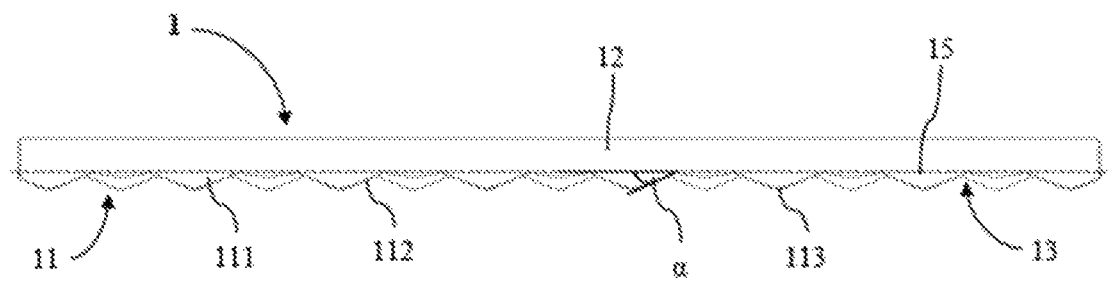
FIG. 2 shows a side view of the film from FIG. 1.

As can be seen in FIG. 2, film 1 has a reference plane 15 which corresponds to the surface 13 and from which the elevations 111 protrude from the microstructure 11. The flank sections 112 of the elevations 111 are formed straight from the side. They adjoin the reference plane 15 or emanate from same. The flank sections 112 and the reference plane 15 have a uniform angle $\alpha$, which is constant over the entire film 1 and the entire amount of individual elevations 111. The uniform angle $\alpha$ is 17°, wherein there can be certain tolerance deviations, for example, for production reasons.

Figure 3:
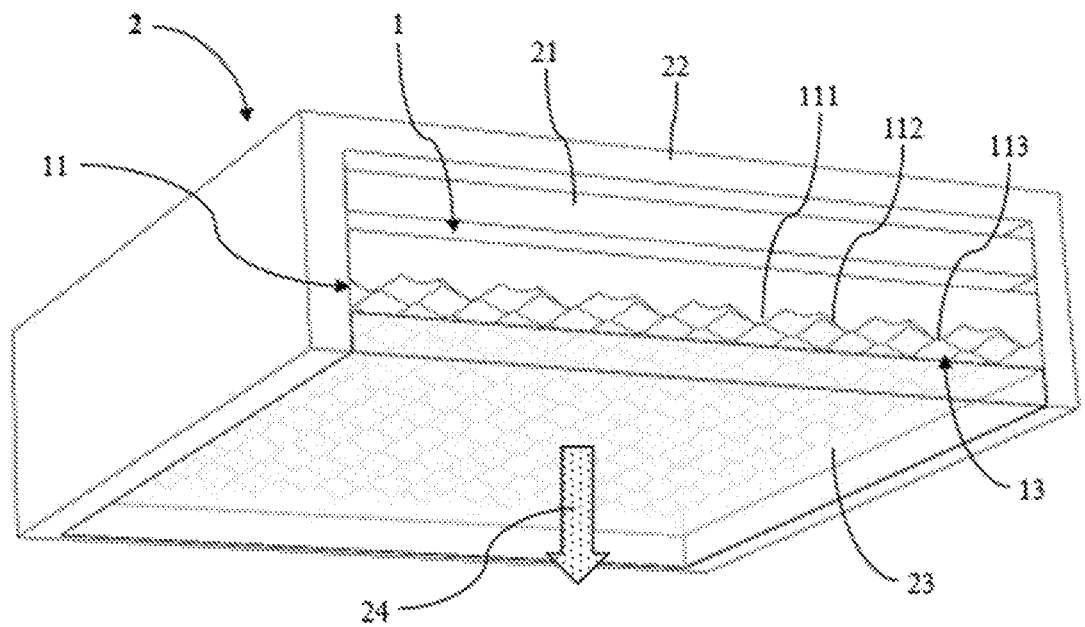
FIG. 3 shows a perspective view of an embodiment of a light fixture according to the invention with the film from FIG. 1.

In FIG. 3, an embodiment of a light fixture 2 according to the invention is schematically shown in which the film 1 is arranged. The light fixture 2 is formed as a ceiling light, which emits light in a downwards vertical radiation direction 24. The light fixture 2 comprises a housing 22, in which a lighting means is arranged with an organic illuminating diode (OLED lighting means) 21. The OLED lighting means 21 radiates light in an undirected manner from its lower surface. Likewise in the housing 22, the film 1 is attached parallel to the OLED lighting means 21, wherein the microstructure 11 faces away from the OLED lighting means 21. The film 1 completely covers the OLED lighting means 21 on its light-emitting lower surface or in the radiation direction 24.

At the bottom, the housing 22 is enclosed by a transparent lens 23. The lens 23 covers the film 1 from the outside. When the light fixture 2 is operated, the OLED lighting means 21 radiates its undirected light on the underside. This light penetrates the film 1 and is directed and shaped by its microstructure 11. In particular, the shape of the elevations 111 with the uniform angle $\alpha$ of 17° enables a high degree of light efficiency to be produced in the surface or a high light output rate (LOR) to be achieved. At the same time, it also enables effective and precise production of a preferred light distribution curve (LDC). In particular, the glare of the light fixture 2 can be sufficiently suppressed in this way. Using the rounded peaks 113 of the elevations 111, undesired rainbow effects can also be minimised.

Figure 4:
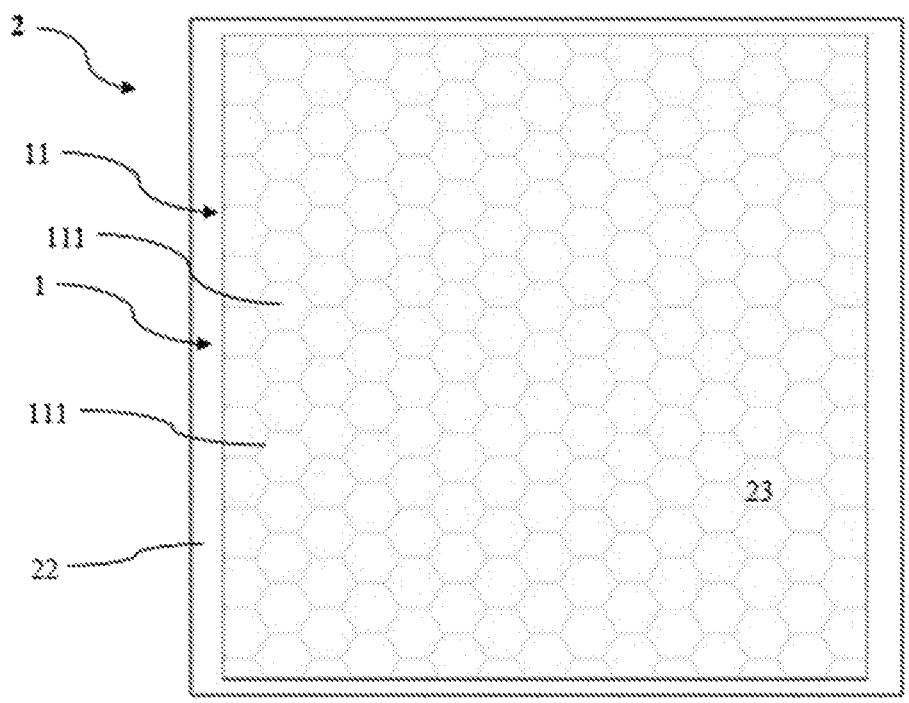
FIG. 4 shows a front view of the light fixture from FIG. 3.

FIG. 4 shows the light fixture 2 from below or from its lens 23. Here, it can be seen through the transparent lens 23 that the elevations 111 of the microstructure 11 of the film 1 have a basic hexagonal form. Such a basic form enables the film 1 to be densely or completely provided with elevations 111.

Although the invention is shown and described in detail by means of the figures and the associated description, this representation and this detailed description are to be understood as illustrative and exemplary, but not as limiting the invention. In order not to embellish the invention, in certain cases well-known structures and techniques may not be shown and described in detail. Obviously, persons skilled in the art can make changes and modifications without exceeding the scope of the following claims. In particular, the present invention covers further exemplary embodiments with any combinations of features that may deviate from the explicitly described combinations of features.

The present disclosure also comprises embodiments with any combination of features that are mentioned or shown before or after the different embodiments. It also comprises individual features in the figures, even if they are shown therein in relation to other features and/or not mentioned above or below. The alternatives to embodiments and individual alternatives to the features thereof described in the figures and in the description may also be excluded from the subject matter of the invention or from the disclosed subjects. The disclosure comprises embodiments that exclusively comprise the features described in the claims or in the exemplary embodiments, as well as embodiments that comprise additional other features.

In addition, the expression "comprise" and derivatives thereof do not exclude other elements or steps. The indefinite article "a" or "an" and derivatives thereof likewise do not exclude a plurality. The functions of a plurality of the features cited in the claims can be fulfilled by a unit or by a step. The mere fact that certain dimensions are listed in dependent claims that are different to one another does not indicate that a combination of these dimensions cannot be used advantageously. In particular, the terms "substantially", "about", "approximately" and the like used in connection with a property or a value also define the property precisely or define the value precisely. When used in connection with a given numerical value or range, the terms "about" and "approximately" can refer to a value or range that lies within 20%, within 10%, within 5%, or within 2% of the given value or range. All reference signs in the claims are not to be understood as limiting the scope of the claims.

What is claimed is:

1. An optical layer made from a light-permeable material, the optical layer being configured as a flexible film and comprising:
    a surface; and
    an optical microstructure having a plurality of elevations,
    wherein the plurality of elevations of the optical microstructure protrude from a reference plane, which is parallel to the surface,
    wherein the plurality of elevations of the optical microstructure each have a flank section which adjoins the reference plane and forms a uniform angle with the reference plane,
    wherein the uniform angle is in a range from about 10° to about 26°,
    wherein the plurality of elevations of the optical microstructure have a hexagonal base area,
    wherein the plurality of elevations of the optical microstructure each have a rounded peak,
    wherein the rounded peaks of the plurality of elevations each adjoin the flank sections, and
    wherein the flank sections are formed to be straight.

2. The optical layer according to claim 1, in which the surface is in the reference plane.

3. The optical layer according to claim 1, wherein the optical layer is produced from a material having a refractive index in a range from about 1.3 to about 1.7.

4. The optical layer according to claim 3, wherein the material is a polycarbonate.

5. The optical layer according to claim 1, wherein the plurality of elevations of the optical microstructure are each designed as cones, tapers, prisms or pyramids.

6. The optical layer according to claim 1, wherein the plurality of elevations each comprise a base area, which has a maximum diameter which is within a range from about 5 µm to about 250 µm or in a range from about 50 µm to about 200 µm or in a range from about 150 µm to about 190 µm.

7. The optical layer according to claim 1, wherein the plurality of elevations each have a height which is within a range from about 5 µm to about 100 µm or in a range from about 20 µm to about 80 µm or in a range from about 30 µm to about 60 µm.

8. The optical layer according to claim 1, wherein all elevations of the optical microstructure have the same uniform angle.

9. A light fixture having a lighting means and an optical layer according to claim 1, wherein light can be radiated in a substantially undirected manner by the lighting means and wherein the optical layer covers the lighting means in a radiation direction of the light fixture.

10. The light fixture according to claim 9, wherein the light fixture is formed as a surface light fixture.

11. The light fixture according to claim 9, wherein the optical layer is arranged immediately adjacent to the lighting means.

12. The optical layer according to claim 1, wherein the uniform angle is in the range from about 13° to about 23°.

13. The optical layer according to claim 1, wherein the uniform angle is in the range from about 15° to about 20°.

* * * * *